(12) United States Patent
Jeon et al.

(10) Patent No.: US 12,722,530 B2
(45) Date of Patent: Sep. 1, 2026

(54) METHOD AND DEVICE FOR CONTROLLING STATE OF CHARGE

(71) Applicants: Hyundai Motor Company, Seoul (KR); Kia Corporation, Seoul (KR)

(72) Inventors: Byungwoo Jeon, Hwaseong-Si (KR); Youngkwang Kim, Hwaseong-Si (KR); Jaehee Park, Hwaseong-Si (KR)

(73) Assignees: Hyundai Motor Company, Seoul (KR); Kia CORPORATION, Seoul (KR)

( * ) Notice: Subject to any disclaimer, the term of this patent is extended or adjusted under 35 U.S.C. 154(b) by 72 days.

(21) Appl. No.: 18/965,928

(22) Filed: Dec. 2, 2024

(65) Prior Publication Data

US 2026/0014902 A1 Jan. 15, 2026

(30) Foreign Application Priority Data

Jul. 10, 2024 (KR) ........................ 10-2024-0090935

(51) Int. Cl.
*B60L 58/30* (2019.01)

(52) U.S. Cl.
CPC ........... *B60L 58/30* (2019.02); *B60L 2240/12* (2013.01)

(58) Field of Classification Search
CPC ........................................................ B60L 58/30
See application file for complete search history.

(56) References Cited

U.S. PATENT DOCUMENTS 11,505,078 B2 * 11/2022 Park ........................ B60L 53/62
11,628,747 B2 * 4/2023 Seung ........................ B60L 7/18 701/22
12,150,211 B2 * 11/2024 Belleschi ................ H04W 4/08
12,405,120 B2 * 9/2025 Kim ...................... B60W 40/13
2026/0014902 A1 * 1/2026 Jeon ........................ B60L 58/30

* cited by examiner

*Primary Examiner* — Michael A Berns
(74) *Attorney, Agent, or Firm* — Banner & Witcoff, Ltd.

(57) ABSTRACT

A state of charge (SOC) control method of controlling the SOC of a fuel cell electric vehicle (FCEV) in response to a change in altitude of the FCEV is provided. The method may include setting a first altitude at a start time of operating the FCEV; determining, based on a measurement value of an accelerometer, a travel distance and a first amount of altitude change during a predetermined time duration since the start time; determining an adjustment time for adjusting past driving data of the FCEV; determining, based on the adjustment time, a second amount of altitude change; determining, based on the second amount of altitude change, a target state of charge (SOC) as an input parameter; determining, based on a comparison between a current SOC and the target SOC, a required amount of additional fuel cell (FC) power generation; and controlling the FCEV.

20 Claims, 9 Drawing Sheets

FIG. 5

| | $\Delta h'$ [m] \ GVW [kg] | 10000 | 17000 |
|---|---|---|---|
| ④ | -500 | 50 | 50 |
| | -400 | 51 | 51 |
| | -300 | 52 | 52 |
| | -200 | 53 | 53 |
| | -100 | 56 | 56 |
| ① | 0 | 60 | 60 |
| | 100 | 64 | 64 |
| | 200 | 67 | 67 |
| | 300 | 68 | 68 |
| | 400 | 69 | 69 |
| ⑤ | 500 | 70 | 70 |
| | 600 | 70 | 70 |
| | 700 | 70 | 70 |
| | 800 | 70 | 70 |
| | 900 | 70 | 70 |

② (upward arrow beside rows -400 to -100)

③ (downward arrow beside rows 100 to 400)

FIG. 7

| | $\Delta h''$ [m] \ GVW [kg] | 10000 | 17000 |
|---|---|---|---|
| ④ | -500 | 80 | 80 |
| | -400 | 80 | 80 |
| | -300 | 80 | 80 |
| | -200 | 80 | 80 |
| | -100 | 80 | 80 |
| ① | 0 | 70 | 70 |
| | 100 | 70 | 70 |
| | 200 | 70 | 70 |
| | 300 | 65 | 65 |
| | 400 | 60 | 60 |
| | 500 | 60 | 60 |
| | 600 | 57.5 | 57.5 |
| | 700 | 55 | 55 |
| | 800 | 52.5 | 52.5 |
| ⑤ | 900 | 50 | 50 |

②

③

METHOD AND DEVICE FOR CONTROLLING STATE OF CHARGE

CROSS-REFERENCE TO RELATED APPLICATION

This application claims the benefit of Korean Patent Application No. 10-2024-0090935, filed in the Korean Intellectual Property Office on Jul. 10, 2024, the entire contents of which are incorporated herein by reference.

BACKGROUND

(a) Field

The present disclosure relates to a method and device for controlling a state of charge (SOC), more specifically, to a method and device for controlling the SOC of a fuel cell electric vehicle (FCEV).

(b) Description

The driving performance of electric vehicles, such as fuel cell electric vehicles and battery electric vehicles, may be affected by SOC changes due to driving path characteristics. For example, driving paths that cause large SOC changes, such as an uphill path or a downhill path, may adversely affect the driving performance of vehicles. In general, when a vehicle is driving uphill, more energy may be required, and the SOC may decrease rapidly as power consumption increases. When the vehicle drives downhill, gravity may help the acceleration of the vehicle and relatively less energy is required. Because charging is performed by regenerative braking, the SOC may increase. The SOC level being too low or too high may both negatively impact battery life, and as the SOC decreases, the distance to empty may decrease or the vehicle's acceleration performance and maximum speed may decrease. This problem may be more pronounced, particularly, in large trucks, large buses, and the like, which consume a significant amount of energy due to their large weights when climbing uphill. For example, an uphill or downhill road on a steep mountain pass may significantly decrease the range of an electric vehicle. For example, large hydroelectric or electric trucks and buses with a weight class of 34 tons or 17 tons may suffer from a drop in the SOC carrying a full cargo. Therefore, for driving paths with steep or prolonged inclines and declines, more stable SOC management may be needed compared to traveling on flat grounds.

SUMMARY

The present disclosure attempts to provide a method and device for controlling an SOC, capable of providing stable SOC management in consideration of driving path characteristics on the basis of an accelerometer provided in an FCEV even in a situation where GPS signals are not provided.

According to one or more example embodiments of the present disclosure, a method performed by an apparatus of a fuel cell electric vehicle (FCEV) may include: setting a first altitude at a start time of operating the FCEV; determining, based on a measurement value of an accelerometer associated with the FCEV, a travel distance and a first amount of altitude change during a predetermined time duration since the start time; determining, based on at least one of the travel distance or the first amount of altitude change, an adjustment time for adjusting past driving data of the FCEV; determining, based on the adjustment time, a second amount of altitude change; determining, based on the second amount of altitude change, a target state of charge (SOC) as an input parameter; determining, based on a comparison between a current SOC and the target SOC, a required amount of additional fuel cell (FC) power generation; and controlling, based on the required amount of additional FC power generation, the FCEV.

Determining the travel distance and the first amount of altitude change may include: determining the travel distance based on: a vehicle speed of the FCEV, and a tasking period of a vehicle control unit (VCU) of the FCEV.

Determining the travel distance may include: determining the travel distance based on Equation 1.

$$\Delta S = \int_{t_{n-1}}^{t_n} v\,dt \qquad \text{Equation 1}$$

ΔS may represent the travel distance, and v may represent the vehicle speed of the FCEV.

Determining the travel distance and the first amount of altitude change may include: determining the first amount of altitude change based on: a vehicle speed of the FCEV, and a tasking period of a vehicle control unit (VCU) of the FCEV.

Determining the first amount of altitude change may include: determining the first amount of altitude change based on Equation 2.

$$\Delta h = \int_{t_{n-1}}^{t_n} v\sin(\theta)\,dt \qquad \text{Equation 2}$$

Δh may represent the first amount of altitude change, v may represent the vehicle speed of the FCEV, sin(θ) may represent an acceleration relationship between inclination θ of a road and an acceleration of the FCEV, and the acceleration of the FCEV may be measured by the accelerometer.

The method may further include: determining the acceleration relationship based on Equation 3.

$$\sin(\theta) = \frac{a_{veh} - \dot{v}_{hrw} + d\omega_{yaw}^2}{g} \qquad \text{Equation 3}$$

$a_{veh}$ may represent an accelerometer measurement value, $\dot{v}_{hrw}$ may represent a pitch term based on a movement of the FCEV, $$d\omega_{yaw}^2$$

may be a yaw term due to rotational inertia, and g may represent a gravitational acceleration.

Determining the adjustment time may include: determining whether the travel distance is greater than or equal to a threshold value; and determining the adjustment time by determining a first time at which the travel distance is greater than or equal to the threshold value. Determining the second amount of altitude change may include: determining the second amount of altitude change by determining a difference between a second altitude at the adjustment time and a third altitude at a second time before the adjustment time.

Determining the adjustment time may include: determining whether the first amount of altitude change is greater than or equal to a threshold value; and determining the adjustment time by determining a first time at which the first amount of altitude change is greater than or equal to the threshold value. Determining the second amount of altitude change may include: determining the second amount of altitude change by determining a difference between a first altitude at the adjustment time and the first altitude at the start time.

Determining the target SOC may include: determining the target SOC based on a mapping table associated with the second amount of altitude change.

According to one or more example embodiments of the present disclosure, a method performed by an apparatus of a fuel cell electric vehicle (FCEV) may include: setting a first altitude at a start time of operating the FCEV; determining, based on a measurement value of an accelerometer associated with the FCEV, a travel distance and a first amount of altitude change during a predetermined time duration since the start time; determining, based on the travel distance, a first adjustment time for adjusting past driving data of the FCEV; determining, based on the first amount of altitude change, a second adjustment time for adjusting the past driving data of the FCEV; determining, based on the first adjustment time and the second adjustment time, and based on characteristics of a driving path of the FCEV, a third adjustment time; determining, based on the third adjustment time, a second amount of altitude change; determining, based on the second amount of altitude change, a target state of charge (SOC) as an input parameter; determining, based on a comparison between a current SOC and the target SOC, a required amount of additional fuel cell (FC) power generation; and controlling, based on the required amount of additional FC power generation, the FCEV.

Determining the travel distance and the first amount of altitude change may include: determining the travel distance based on: a vehicle speed of the FCEV, and a tasking period of a vehicle control unit (VCU) of the FCEV.

Determining the travel distance and the first amount of altitude change may include: determining the first amount of altitude change based on: a vehicle speed of the FCEV, and a tasking period of a vehicle control unit (VCU) of the FCEV.

Determining the first adjustment time may include: determining whether the travel distance is greater than or equal to a threshold value; and determining the first adjustment time by determining a time at which the travel distance is greater than or equal to the threshold value.

Determining the second adjustment time may include: determining whether the first amount of altitude change is greater than or equal to a threshold value; and determining the second adjustment time by determining a time at which the first amount of altitude change is greater than or equal to the threshold value.

Determining the second amount of altitude change may include one of: determining, based on the third adjustment time being determined according to the first adjustment time, the second amount of altitude change by determining a difference between a second altitude at the first adjustment time and a third altitude at a time before the first adjustment time; or determining, based on the third adjustment time being determined according to the second adjustment time, the second amount of altitude change by determining a difference between a fourth altitude at the second adjustment time and the first altitude at the start time.

According to one or more example embodiments of the present disclosure, an apparatus may include: one or more memory devices storing instructions; and one or more processors configured to execute the instructions to cause a fuel cell electric vehicle (FCEV) to: set a first altitude at a start time of operating the FCEV; determine, based on a measurement value of an accelerometer associated with the FCEV, a travel distance and a first amount of altitude change during a predetermined time duration since the start time; determine, based on at least one of the travel distance or the first amount of altitude change, an adjustment time for adjusting past driving data of the FCEV; determining, based on the adjustment time, a second amount of altitude change; determining, based on the second amount of altitude change, a target state of charge (SOC) as an input parameter; determining, based on a comparison between a current SOC and the target SOC, a required amount of additional fuel cell (FC) power generation; and controlling, based on the required amount of additional FC power generation, the FCEV.

The one or more processors may be configured to execute the instructions to cause the FCEV to determine the travel distance by: determining the travel distance based on: a vehicle speed of the FCEV, and a tasking period of a vehicle control unit (VCU) of the FCEV.

The one or more processors may be configured to execute the instructions to cause the FCEV to determine the first amount of altitude change by: determining the first amount of altitude change based on: a vehicle speed signal of the FCEV, and a tasking period of a vehicle control unit (VCU) of the FCEV.

The one or more processors may be configured to execute the instructions to cause the FCEV to determine the adjustment time by: determining whether the travel distance is greater than or equal to a threshold value; and determining the adjustment time by determining a first time at which the travel distance is greater than or equal to the threshold value. The one or more processors may be configured to execute the instructions to cause the FCEV to determine the second amount of altitude change by: determining the second amount of altitude change by determining a difference between a second altitude at the adjustment time and a third altitude at a second time before the adjustment time.

The one or more processors may be configured to execute the instructions to cause the FCEV to determine the adjustment time by: determining whether the first amount of altitude change is greater than or equal to a threshold value; and determining the adjustment time by determining a first time at which the first amount of altitude change is greater than or equal to the threshold value. The one or more processors may be configured to execute the instructions to cause the FCEV to determine the second amount of altitude change by: determining the second amount of altitude change by determining a difference between a first altitude at the adjustment time and the first altitude at the start time.

BRIEF DESCRIPTION OF THE DRAWINGS

FIGS. 3, 4, 5, 6, and 7 are views illustrating implementation examples of the SOC control device and the SOC control method.

DETAILED DESCRIPTION

Figure 1:
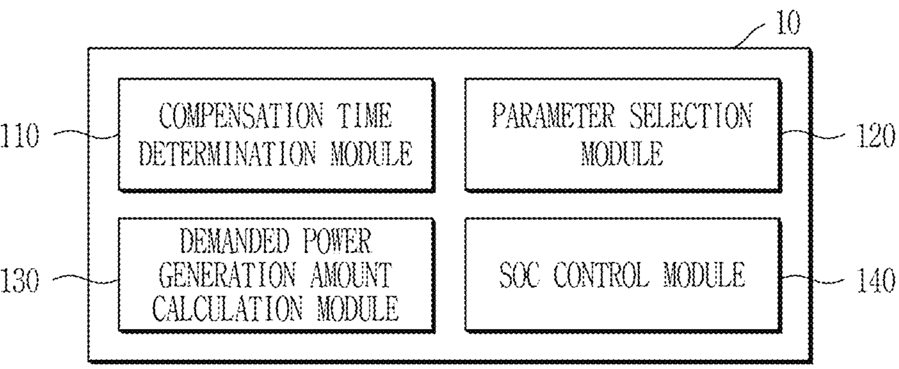
FIG. 1 is a view illustrating an SOC control device.

Hereinafter, one or more example embodiments of the present disclosure will be described in detail with reference to the accompanying drawings such that those skilled in the art can easily implement them. As those skilled in the art would realize, the described example embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the specification and the claims, unless explicitly described to the contrary, the word "comprise", and variations such as "comprises" or "comprising", will be understood to imply the inclusion of stated elements but not the exclusion of any other elements. Terms including an ordinary number, such as first and second, are used for describing various constituent elements, but the constituent elements are not limited by the terms. The terms are used only to discriminate one constituent element from another constituent element.

Throughout this specification, the term "unit" or "module", the suffix "-or" or "-er", or the like may refer to a unit for processing at least one function or operation that is described in this specification, which may be implemented with hardware or circuitry, software, or a combination of software and hardware or circuitry. In a method and device for controlling a state of charge (SOC) according to one or more example embodiments to be described below, at least some components or functions may be implemented as programs or software, and the programs or software may be stored in computer-readable media.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

In some implementations, managing a stable SOC may be achieved by reflecting changes in altitude when controlling the vehicle based on obtaining the current location and altitude of the vehicle through a global positioning system (GPS). However, this method may be difficult to apply to vehicles that are not equipped with GPS devices. In some implementations, changes in altitude may be reflected in controlling the vehicle based on an accelerometer provided in the vehicle.

FIG. 1 is a view illustrating an SOC control device.

Referring to FIG. 1, a driver SOC control device 10 may execute a program code or insulations stored in one or more memory devices through one or more processors. For example, the driver SOC control device 10 may be implemented as a computing device 50 as will be described below with reference to FIG. 9. In this case, one or more processors may correspond to a processor 510 of the computing device 50, and one or more memory devices may correspond to a memory 520 of the computing device 50. The program code or the insulations may be executed by one or more processors so as to perform a function of controlling the SOC of a fuel cell electric vehicle (FCEV) in response to a change in altitude of the FCEV. In this specification, the term "module" is used to logically distinguish these functions which are performed by the program code or the insulations.

The SOC control device 10 may include a compensation time (also referred to as an adjustment time) determination module 110, a parameter selection module 120, a power generation demand calculation module 130, and an SOC control module 140.

The compensation time determination module 110 may determine a compensation time for compensating for (e.g., adjusting) past driving data of the FCEV. Specifically, the compensation time determination module 110 may determine a compensation time $T_i$ based on an accelerometer measurement value $a_{veh}$ obtained from the FCEV (i.e., an accelerometer mounted in the FCEV).

The compensation time determination module 110 may first set the driving start altitude $h_0$ at the driving start time $T_0$ for the FCEV. The travel distance at the driving start time $T_0$ may be set to a predetermined value, for example, 0. The driving start altitude $h_0$ and the travel distance at the driving start time $T_0$ may be treated as reference points for determining the compensation time $T_i$.

The compensation time determination module 110 may calculate a travel distance ΔS and a first altitude change amount Δh for a predetermined time duration $(t_{n-1}-t_n)$, on the basis of the accelerometer measurement value $a_{veh}$ obtained from the FCEV. Calculating the travel distance ΔS and the first altitude change amount Δh may be performed in real time. The compensation time determination module 110 may determine the compensation time $T_i$, using at least one of the travel distance ΔS and the first altitude change amount Δh.

The compensation time determination module 110 may calculate the travel distance ΔS based on the vehicle speed signal of the FCEV and the tasking period of a vehicle control unit (VCU). The compensation time determination module 110 may obtain the vehicle speed signal of the FCEV, using a wheel speed sensor, a vehicle speed sensor (VSS), a global positioning system (GPS), and the like. Meanwhile, the VCU may comprehensively control various systems of the FCEV. For example, the VCU may perform various functions such as energy management, power control, fuel cell management, battery management, driving mode management, etc. The tasking period of the VCU may refer to the execution cycle of tasks which are performed by the VCU to control various systems of the FCEV.

The compensation time determination module 110 may calculate the travel distance ΔS, using the following Equation 1.

$$\Delta S = \int_{t_{n-1}}^{t_n} v\,dt \qquad \text{(Equation 1)}$$

Here, ΔS may be the travel distance, and v may be the vehicle speed of the FCEV. For example, when the unit of the vehicle speed may be kph and the unit of the tasking period of the VCU is s, the compensation time determination module 110 may calculate the travel distance ΔS (in meters), using the following Equation 1-1.

$$\Delta S = \int_{t_{n-1}}^{t_n} v\,\frac{1000}{36000}\,dt \qquad \text{(Equation 1-1)}$$

The compensation time determination module 110 may calculate the first altitude change amount Δh based on the vehicle speed signal of the FCEV and the tasking period of the VCU. The compensation time determination module 110 may obtain the vehicle speed signal of the FCEV, using a wheel speed sensor, a vehicle speed sensor, a GPS, etc. The tasking period of the VCU may refer to the execution cycle of tasks which are performed by the VCU to control various systems of the FCEV.

The compensation time determination module 110 may calculate the first altitude change amount Δh, using the following Equation 2.

$$\Delta h = \int_{t_{n-1}}^{t_n} v \sin(\theta)\, dt \quad \text{(Equation 2)}$$

Here, Δh may be the first altitude change amount, v may be the vehicle speed of the FCEV, and sin(θ) may be the acceleration relationship between the inclination θ of a road and the acceleration of the FCEV which is measured by the accelerometer. For example, when the unit of the vehicle speed is kph and the unit of the tasking period of the VCU is s, the compensation time determination module 110 may calculate the first altitude change amount Δh (in meters), using the following Equation 2-1.

$$\Delta h = \int_{t_{n-1}}^{t_n} v \frac{1000}{3600} \sin(\theta)\, dt \quad \text{(Equation 2-1)}$$

The acceleration relationship may be calculated using the following Equation 3.

$$\sin(\theta) = \frac{a_{veh} - \dot{v}_{hrw} + d\omega_{yaw}^2}{g} \quad \text{(Equation 3)}$$

Here, $a_{veh}$ may be the accelerometer measurement value, $\dot{v}_{hrw}$ may be the pitch based on the movement of the FCEV, $$d\omega_{yaw}^2$$

may be the yaw term due to the rotational inertia, and g may be the gravitational acceleration. The pitch is a rotational motion of the vehicle around its front and rear axis, and may be a motion showing a phenomenon that the front of the vehicle rises and the rear falls, or the front falls and the rear rises during acceleration or deceleration. The yaw is a rotational motion of the vehicle around the longitudinal axis of the vehicle, and may be a motion showing a phenomenon that the front of the vehicle rotates from side to side.

The compensation time determination module 110 may determine whether the travel distance ΔS calculated as described above is equal to or greater than a predefined first setting value (e.g., a first threshold value) $c_s$*. When it is determined that the travel distance ΔS is equal to or greater than the first setting value $c_s$*, the compensation time determination module 110 may determine the moment when the travel distance ΔS satisfies the first setting value $c_s$* or greater, as the compensation time $T_i$. The first setting value $c_s$* may be set to, for example, 4,000 m.

The parameter selection module 120 may calculate a second altitude change amount $\Delta h_i'$ relative to the compensation time $T_i$. Specifically, the parameter selection module 120 may calculate the difference between a first altitude $h_i$ at the compensation time $T_i$ and a second altitude $h_{i-1}$ at a previous time $T_{i-1}$, as the second altitude change amount $\Delta h_i'$. Also, the parameter selection module 120 may select the second altitude change amount $\Delta h_i'$ as an input parameter.

The compensation time determination module 110 may determine whether the first altitude change amount Δh calculated as described above is equal to or greater than a predefined second setting value (e.g., a second threshold value) $c_h$*. When it is determined that the first altitude change amount Δh is equal to or greater than the second setting value $c_h$*, the compensation time determination module 110 may determine the moment when the first altitude change amount Δh satisfies the second setting value $c_h$* or greater, as the compensation time $T_i$. The second setting value $c_h$* may be set to, for example, 100 m.

The parameter selection module 120 may calculate a second altitude change amount $\Delta h_i''$ relative to the compensation time $T_i$. Specifically, the parameter selection module 120 may calculate the difference between the first altitude $h_i$ at the compensation time $T_i$ and the driving start altitude $h_0$ at the driving start time $T_0$, as the second altitude change amount $\Delta h_i''$. Also, the parameter selection module 120 may select the second altitude change amount $\Delta h_i''$ as an input parameter.

The power generation demand calculation module 130 may obtain a target SOC $SOC_{tgt}$, using the second altitude change amount $\Delta h_i'$ or $\Delta h_i''$ as an input parameter. The power generation demand calculation module 130 may calculate the target SOC $SOC_{tgt}$ through a map (e.g., a mapping table) having the second altitude change amount $\Delta h_i'$ or $\Delta h_i''$ as an input parameter. Here, the map may include a plurality of target SOCs ($SOC_{tgt}$) values which are determined according to the second altitude change amount $\Delta h_i'$ or $\Delta h_i''$ and the gross vehicle weight (GVW) of the FCEV. Also, the power generation demand calculation module 130 may calculate a required amount of additional fuel cell (FC) power generation $P_{adj}$ by comparing the target SOC $SOC_{tgt}$ and the current SOC $SOS(T_i)$.

For stable SOC management on the FCEV, the SOC control module 140 may perform SOC control, such as increasing the SOC by charging the battery with the required amount of additional FC power generation $P_{adj}$ when the SOC of the battery falls below a target range.

Even in a situation where GPS signals are not provided, it is possible to provide stable SOC management on the FCEV in consideration of driving path characteristics by calculating a required amount of additional FC power generation reflecting a change in altitude on the basis of the accelerometer provided in the FCEV.

The compensation time determination module 110 may determine the compensation time $T_i$ in consideration of both of the first method of determining the compensation time based on the travel distance ΔS and the first setting value $c_s$* and the second method of determining the compensation time based on the first altitude change amount Δh and the second setting value $c_h$*. For example, in the case of the first method, when the FCEV runs a local peak path within the first setting value $c_s$*, a problem may occur in that it is impossible to compensate for this. To make up for this, in the corresponding case, it is possible to change the criterion for determining the compensation time from the travel distance to a change in altitude, thereby solving the corresponding problem.

Specifically, the compensation time determination module 110 may determine a first compensation time $T_{1i}$ for compensating for past driving data of the FCEV using the travel distance ΔS, and determine a second compensation time $T_{2i}$ for compensating for past driving data of the FCEV, using the first altitude change amount $\Delta h$. Subsequently, the compensation time determination module 110 may determine the compensation time $T_i$ based on the first compensation time $T_{1i}$ and the second compensation time $T_{2i}$, according to driving path characteristics.

The compensation time determination module 110 may determine whether the travel distance $\Delta S$ is equal to or greater than the predefined first setting value $c_s$*, and determine the moment when the travel distance $\Delta S$ satisfies the first setting value $c_s$* or greater, as the first compensation time $T_{1i}$, when it is determined that the travel distance $\Delta S$ is equal to or greater than the first setting value $c_s$*. Meanwhile, the compensation time determination module 110 may determine whether the first altitude change amount $\Delta h$ is equal to or greater than the predefined second setting value $c_h$*, and determine the moment when the first altitude change amount $\Delta h$ satisfies the second setting value $c_h$* or greater, as the second compensation time $T_{2i}$, when it is determined that the first altitude change amount $\Delta h$ is equal to or greater than the second setting value $c_h$*.

When the compensation time $T_i$ has been determined according to the first compensation time $T_{1i}$, the parameter selection module 120 may calculate the difference between the first altitude $h_i$ at the compensation time $T_i$ and the second altitude $h_{i-1}$ at the previous time $T_{i-1}$, as the second altitude change amount $\Delta h_i'$. When the compensation time $T_i$ has been determined according to the second compensation time $T_{2i}$, the parameter selection module 120 may calculate the difference between the first altitude $h_i$ at the compensation time $T_i$ and the driving start altitude $h_0$ at the driving start time $T_0$, as the second altitude change amount $\Delta h_i''$.

The power generation demand amount calculation module 130 may obtain the target SOC $SOC_{tgt}$, using the second altitude change amount $\Delta h_i'$ or $\Delta h_i''$ as an input parameter, and calculate the required amount of additional FC power generation $P_{adj}$ by comparing the target SOC $SOC_{tgt}$ and the current SOC $SOS(T_i)$.

Figure 2:
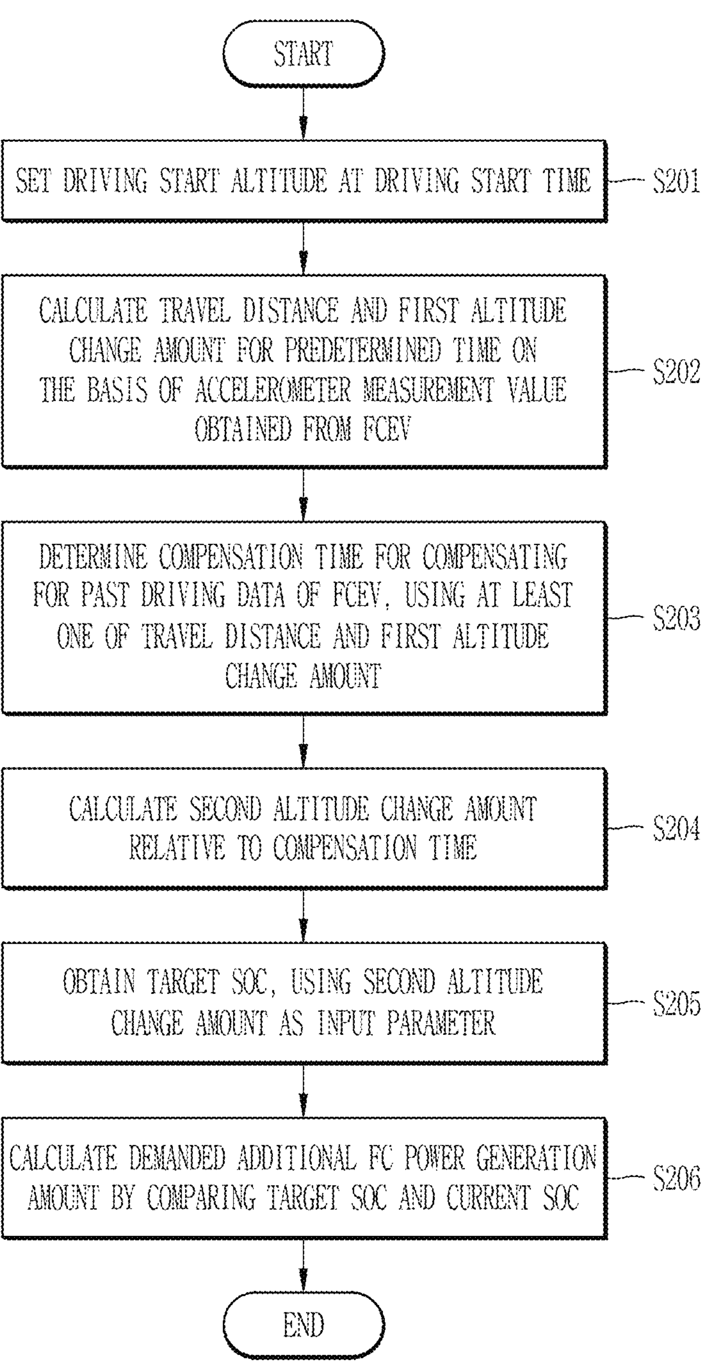
FIG. 2 is a view illustrating an SOC control method.

FIG. 2 is a view illustrating an SOC control method.

Referring to FIG. 2, the SOC control method may include setting a driving start altitude at a driving start time (e.g., a start time of operating the FCEV) (S201), calculating a travel distance and a first altitude change amount during a predetermined time duration since the driving start time based on an accelerometer measurement value obtained from the FCEV (S202), determining a compensation time for compensating for past driving data of the FCEV, using at least one of the travel distance and the first altitude change amount (S203), calculating a second altitude change amount relative to the compensation time (S204), obtaining a target SOC, using the second altitude change amount as an input parameter (S205), and calculating a required amount of additional FC power generation by comparing the target SOC and a current SOC (S206).

As for further details of the above method, the descriptions of the example embodiments which are made in this specification may be referred to, so a redundant description will not be made herein.

FIGS. 3, 4, 5, 6, and 7 are views illustrating implementation examples of the SOC control device and the SOC control method.

Figure 3:
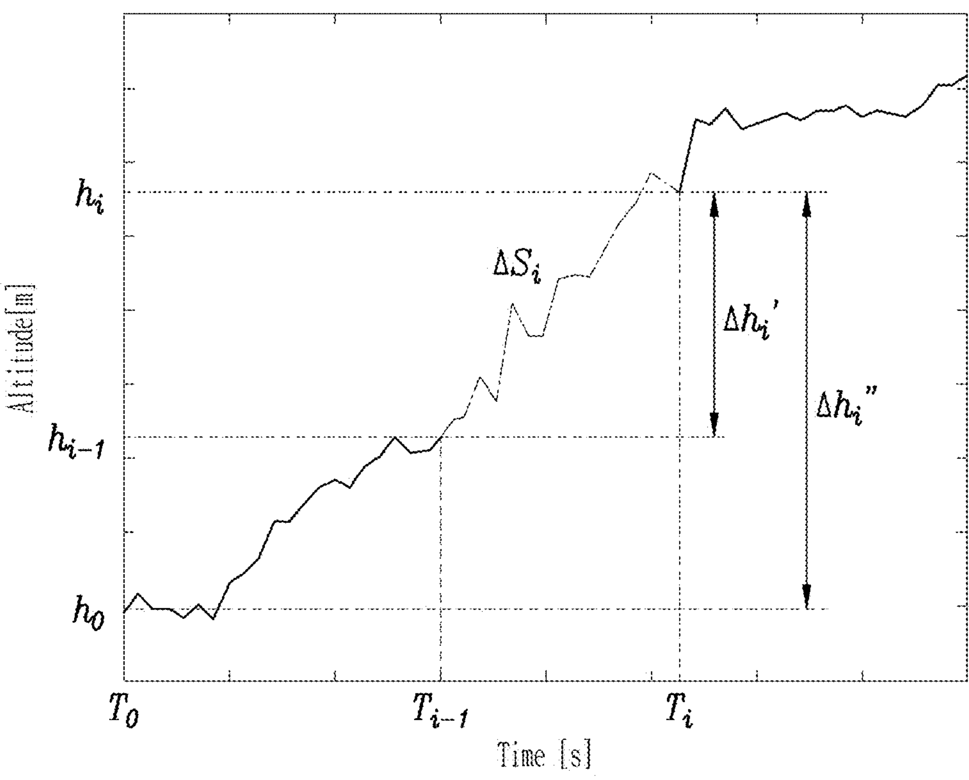

Referring to FIG. 3, as the travel distance at the driving start time $T_0$ is set to 0 m, and the driving start altitude $h_0$ is set, the driving start altitude $h_0$ and the travel distance at the driving start time $T_0$ may be treated as reference points for determining the compensation time $T_i$. The target SOC may be calculated by comparing the travel distance $S_i$ and altitude $h_i$ at the compensation time $T_i$ with information at the previous time $T_{i-1}$ or the driving start time $T_0$.

Figure 4:
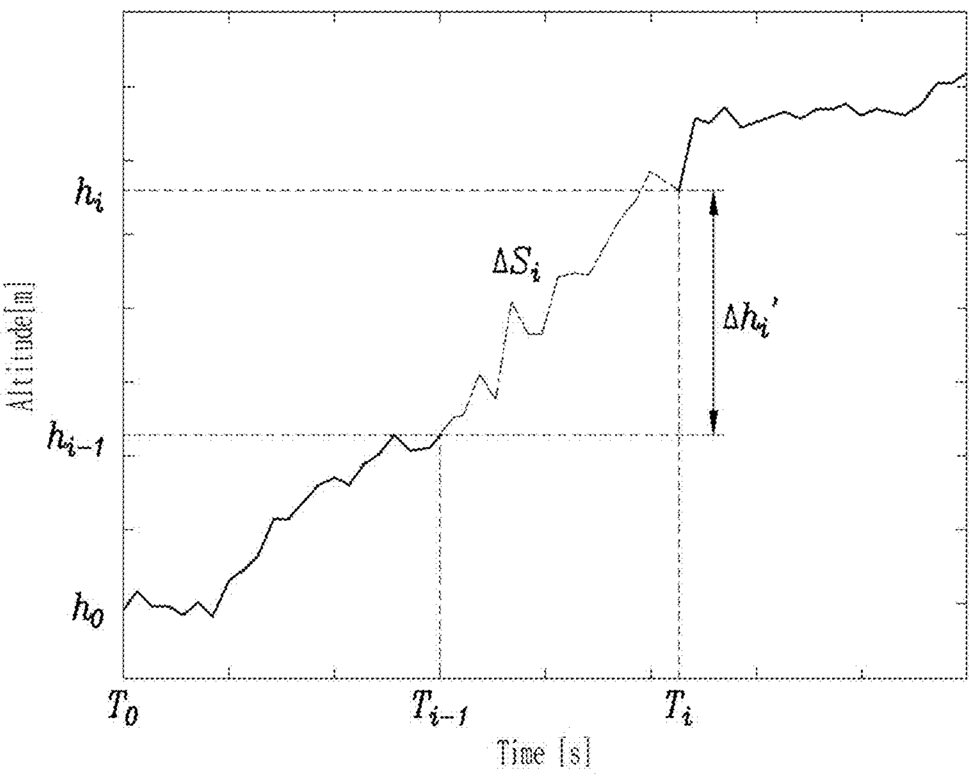

FIGS. 4 and 5 may show calculating the target SOC by comparing the travel distance $S_i$ and altitude $h_i$ at the compensation time $T_i$ with information at the previous time $T_{i-1}$. The moment when the travel distance $\Delta S$ satisfies the predefined first setting value $c_s$* or greater may be determined as the compensation time $T_i$, and the difference between the first altitude $h_i$ at the compensation time $T_i$ and the second altitude $h_{i-1}$ at the previous time $T_{i-1}$ may be calculated as the second altitude change amount $\Delta h_i'$. Thereafter, the target SOC $SOC_{tgt}$ may be calculated through the map having the second altitude change amount $\Delta h_i'$ as an input parameter, and the required amount of additional FC power generation $P_{adj}$ may be calculated by comparing the target SOC $SOC_{tgt}$ with the current SOC $SOS(T_i)$.

For example, during driving on level ground, the target SOC $SOC_{tgt}$ may be 60% (see reference symbol ( ). When a change in altitude after driving a predetermined distance $S_{Th}$ is negative, since regenerative power compensation is required, the target SOC $SOC_{tgt}$ may be decreased (see reference symbol ②). In contrast, when a change in altitude after driving the predetermined distance $S_{Th}$ is positive, since driving power compensation is required, the target SOC $SOC_{tgt}$ may be increased (see reference symbol ③). Meanwhile, during driving downhill, the target SOC $SOC_{tgt}$ may be decreased, but may be maintained at 50% or greater in consideration of driver's anxiety (see reference symbol ④), and during driving uphill, the target SOC $SOC_{tgt}$ may be increased, but may be maintained at 70% or less in consideration of downhill SOC (see reference symbol ⑤).

Figure 6:
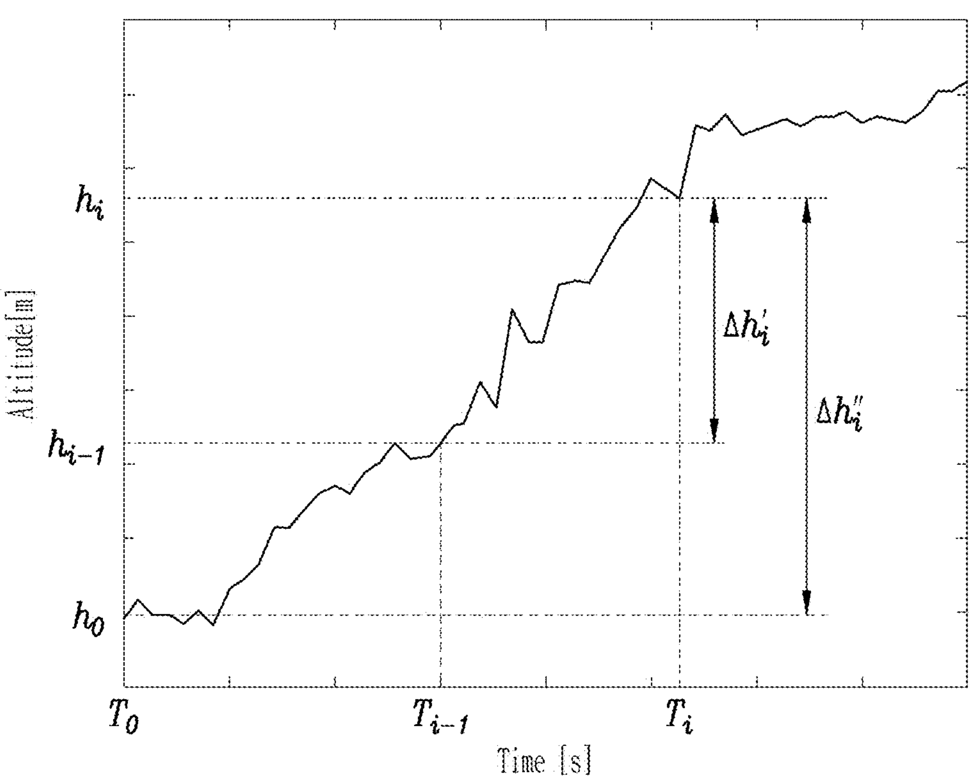

FIGS. 6 and 7 may show calculating the target SOC by comparing the travel distance $S_i$ and altitude $h_i$ at the compensation time $T_i$ with the information at the driving start time $T_0$. The moment when the first altitude change amount $\Delta h$ satisfies the predefined second setting value $c_h$* or greater may be determined as the compensation time $T_i$, and the difference between the first altitude $h_i$ at the compensation time $T_i$ and the driving start altitude $h_0$ at the driving start time $T_0$ may be calculated as the second altitude change amount $\Delta h_i''$. Thereafter, the target SOC $SOC_{tgt}$ may be calculated through a map having the second altitude change amount $\Delta h_i''$ as an input parameter, and the required amount of additional FC power generation $P_{adj}$ may be calculated by comparing the target SOC $SOC_{tgt}$ with the current SOC $SOS(T_i)$.

For example, the target SOC $SOC_{tgt}$ at the driving start altitude $h_0$ may be 70% (see reference symbol ①). When the altitude after driving the predetermined distance $S_{Th}$ is lower than the driving start altitude $h_0$, since the likelihood of driving uphill from then increases, the target SOC $SOC_{tgt}$ may be increased (see reference symbol ②). In contrast, when the altitude after driving the predetermined distance $S_{Th}$ is higher than the driving start altitude $h_0$, since the likelihood of driving downhill from then increases, the target SOC $SOC_{tgt}$ may be decreased (see reference symbol ③). Meanwhile, when the target SOC $SOC_{tgt}$ is increased, the target SOC may be maintained at 80% in consideration of fuel cell power generation stop SOC (see reference symbol ④), and when the target SOC $SOC_{tgt}$ is decreased, the target SOC but may be maintained at 50% or greater in consideration of driver's anxiety (see reference symbol ⑤).

Figure 8:
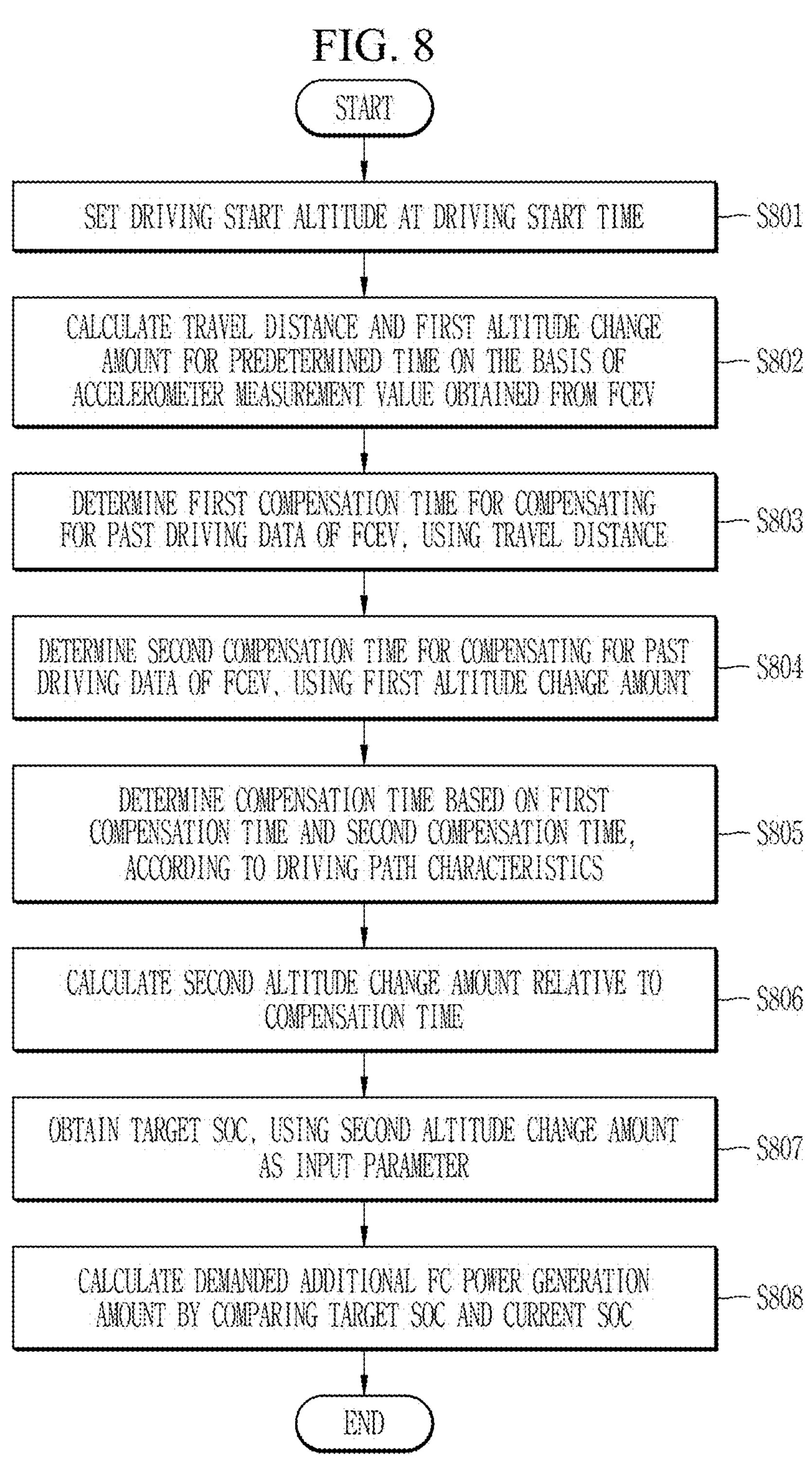
FIG. 8 is a view illustrating an SOC control method.

FIG. 8 is a view illustrating an SOC control method.

Referring to FIG. 8, an SOC control method may include setting a driving start altitude at a driving start time (S801), calculating a travel distance and a first altitude change amount during a predetermined time duration since the driving start time based on an accelerometer measurement value obtained from the FCEV (S802), determining a first compensation time for compensating for past driving data of the FCEV, using the travel distance (S803), determining a second compensation time for compensating for past driving data of the FCEV, using the first altitude change amount (S804), determining a compensation time based on the first compensation time and the second compensation time, according to driving path characteristics (S805), calculating a second altitude change amount relative to the compensation time (S806), obtaining a target SOC, using the second altitude change amount as an input parameter (S807), and calculating a required amount of additional FC power generation by comparing the target SOC and a current SOC (S808).

As for further details of the above method, the descriptions of the example embodiments which are made in this specification may be referred to, so a redundant description will not be made herein.

Figure 9:
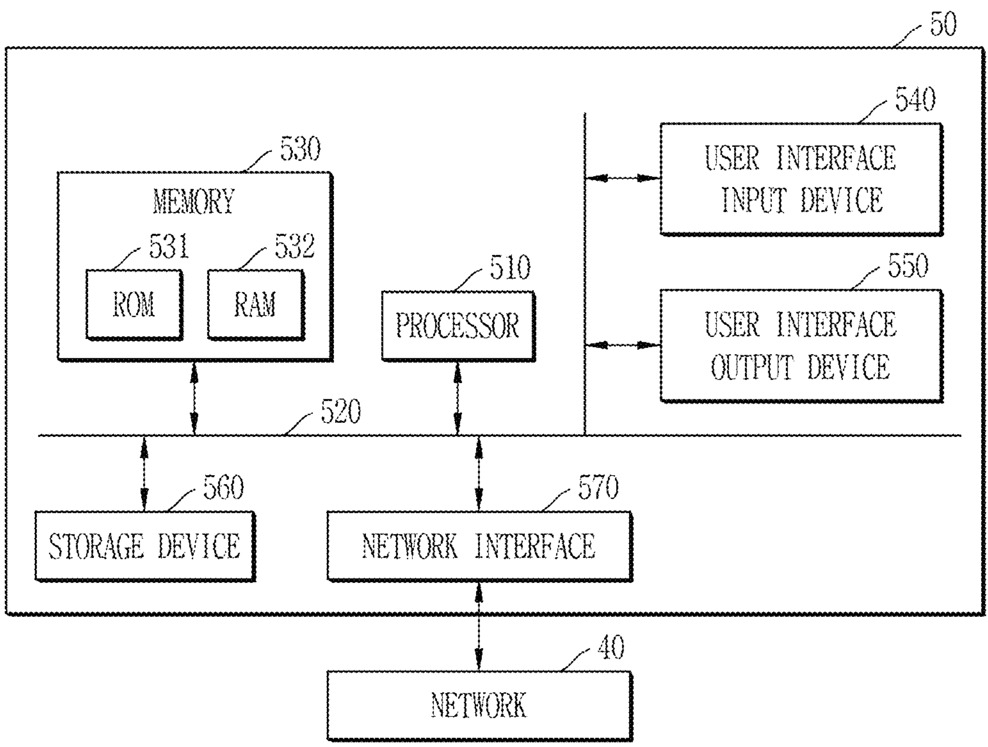
FIG. 9 is a view illustrating a computing device.

FIG. 9 is a view illustrating a computing device.

Referring to FIG. 9, the SOC control methods and device may be implemented using a computing device 50.

The computing device 50 may include at least one of a processor 510, a memory 530, a user interface input device 540, a user interface output device 550, and a storage device 560 which performs communication through a bus 520. The computing device 50 may also include a network interface 570 that is electrically connected to a network 40. The network interface 570 may transmit or receive signals to or from other entities via the network 40.

The processor 510 may be implemented with various types, such as a micro controller unit (MCU), an application processor (AP), a central processing unit (CPU), a graphic processing unit (GPU), a neutral processing unit (NPU), a quantum processing unit (QPU), and the like, and may be an arbitrary semiconductor device that executes instructions stored in the memory 530 or the storage device 560. The processor 510 may be configured to implement the functions and methods described above with reference to FIGS. 1 to 8.

The memory 530 and the storage device 560 may include various forms of volatile or non-volatile storage media. For example, the memory may include a read-only memory (ROM) 531 and a random-access memory (RAM) 532. The memory 530 may be located inside or outside the processor 510, and the memory 530 may be coupled to the processor 510 through various known means.

At least some components or functions of the SOC control methods and device may be implemented as programs or software which is executed in the computing device 50, and the programs or software may be stored in computer-readable media. Specifically, a computer-readable medium may be a medium containing a program for making the computer including the processor 510 for executing programs or instructions stored in the memory 530 or the storage device 560 execute steps included in implementation of the SOC control methods and device.

At least some components or functions of the SOC control methods and device may be implemented using hardware or circuits of the computing device 50 or may be implemented with separate hardware or circuits electrically connectable to the computing device 50.

Even in a situation where GPS signals are not provided, it is possible to provide stable SOC management on the FCEV in consideration of driving path characteristics related to driving uphill, driving downhill, etc., in response to a change in altitude on the basis of the accelerometer provided in the FCEV.

A state of charge (SOC) control method may be an SOC control method of controlling the SOC of a fuel cell electric vehicle (FCEV) in response to a change in altitude of the FCEV, and may include setting a driving start altitude at a driving start time, calculating a travel distance and a first altitude change amount for a predetermined time on the basis of an accelerometer measurement value obtained from the FCEV, determining a compensation time for compensating for past driving data of the FCEV, using at least one of the travel distance and the first altitude change amount, calculating a second altitude change amount relative to the compensation time, obtaining a target SOC, using the second altitude change amount as an input parameter, and calculating a demanded additional fuel cell (FC) power generation amount by comparing the target SOC and a current SOC.

The calculating the travel distance and the first altitude change amount for the predetermined time may include calculating the travel distance on the basis of a vehicle speed signal of the FCEV and a tasking period of a vehicle control unit (VCU).

The calculating the travel distance may include calculating the travel distance using the following Equation 1:

$$\Delta S = \int_{t_{n-1}}^{t_n} v\,dt$$

wherein ΔS is the travel distance, and v is the vehicle speed of the FCEV.

The calculating the travel distance and the first altitude change amount for the predetermined time may include calculating the first altitude change amount on the basis of a vehicle speed signal of the FCEV and the tasking period of the vehicle control unit (VCU).

The calculating the first altitude change amount may include calculating the first altitude change amount, using the following Equation 2:

$$\Delta h = \int_{t_{n-1}}^{t_n} v\sin(\theta)dt$$

wherein Δh is the first altitude change amount, v is the vehicle speed of the FCEV, and sin(θ) is the acceleration relationship between the inclination θ of a road and the acceleration of the FCEV which is measured by an accelerometer.

The acceleration relationship may be calculated using the following Equation 3:

$$\sin(\theta) = \frac{a_{veh} - \dot{v}_{hrw} + d\omega_{yaw}^2}{g}$$

wherein $a_{veh}$ is the accelerometer measurement value, $\dot{v}_{hrw}$ is the pitch based on the move of the FCEV, $$d\omega_{yaw}^2$$

is the yaw term due to the rotational inertia, and g is the gravitational acceleration.

The determining the compensation time may include determining whether the travel distance is equal to or greater than a predefined first setting value, and determining the moment when the travel distance satisfies the first setting value or greater, as the compensation time, when it is determined that the travel distance is equal to or greater than the first setting value, and the calculating the second altitude change amount may include calculating the difference between a first altitude at the compensation time and a second altitude at a previous time as the second altitude change amount.

The determining the compensation time may include determining whether the first altitude change amount is equal to or greater than a predefined second setting value, and determining the moment when the first altitude change amount satisfies the second setting value or greater, as the compensation time, when it is determined that the first altitude change amount is equal to or greater than the second setting value, and the calculating the second altitude change amount may include calculating the difference between a first altitude at the compensation time and the driving start altitude at the driving start time, as the second altitude change amount.

The obtaining the target SOC may include calculating the target SOC through a map having the second altitude change amount as an input parameter.

A state of charge (SOC) control method may be an SOC control method of controlling the SOC of a fuel cell electric vehicle (FCEV) in response to a change in altitude of the FCEV, and may include setting a driving start altitude at a driving start time, calculating a travel distance and a first altitude change amount for a predetermined time on the basis of an accelerometer measurement value obtained from the FCEV, determining a first compensation time for compensating for past driving data of the FCEV, using the travel distance, determining a second compensation time for compensating for past driving data of the FCEV, using the first altitude change amount, determining a compensation time based on the first compensation time and the second compensation time, according to driving path characteristics, calculating a second altitude change amount relative to the compensation time, obtaining a target SOC, using the second altitude change amount as an input parameter, and calculating a demanded additional fuel cell (FC) power generation amount by comparing the target SOC and a current SOC.

The calculating the travel distance and the first altitude change amount for the predetermined time may include calculating the travel distance on the basis of a vehicle speed signal of the FCEV and a tasking period of a vehicle control unit (VCU).

The calculating the travel distance and the first altitude change amount for the predetermined time may include calculating the first altitude change amount on the basis of a vehicle speed signal of the FCEV and the tasking period of the vehicle control unit (VCU).

The determining the first compensation time may include determining whether the travel distance is equal to or greater than a predefined a first setting value, and determining the moment when the travel distance satisfies the first setting value or greater, as the first compensation time, when it is determined that the travel distance is equal to or greater than the first setting value.

The determining the second compensation time may include determining whether the first altitude change amount is equal to or greater than a predefined second setting value, and determining the moment when the first altitude change amount satisfies the second setting value or greater, as the second compensation time, when it is determined that the first altitude change amount is equal to or greater than the second setting value.

The calculating the second altitude change amount may include calculating the difference between a first altitude at the compensation time and a second altitude at a previous time, as the second altitude change amount, when the compensation time has been determined according to the first compensation time, and calculating the difference between the first altitude at the compensation time and the driving start altitude at the driving start time, as the second altitude change amount, when the compensation time has been determined according to the second compensation time.

A state of charge (SOC) control device may be an SOC control device for controlling the SOC of a fuel cell electric vehicle (FCEV) in response to a change in altitude of the FCEV by executing a program code installed in one or more memory devices through one or more processors, wherein the program code may be executed to set a driving start altitude at a driving start time, calculate a travel distance and a first altitude change amount for a predetermined time on the basis of an accelerometer measurement value obtained from the FCEV, determine a compensation time for compensating for past driving data of the FCEV, using at least one of the travel distance and the first altitude change amount, calculate a second altitude change amount relative to the compensation time, obtain a target SOC, using the second altitude change amount as an input parameter, and calculate a demanded additional fuel cell (FC) power generation amount by comparing the target SOC and a current SOC.

The calculating of the travel distance and the first altitude change amount for the predetermined time may include calculating the travel distance on the basis of a vehicle speed signal of the FCEV and a tasking period of a vehicle control unit (VCU).

The calculating of the travel distance and the first altitude change amount for the predetermined time may include calculating the first altitude change amount on the basis of a vehicle speed signal of the FCEV and the tasking period of the vehicle control unit (VCU).

The determining of the compensation time may include determining whether the travel distance is equal to or greater than a predefined first setting value, and determining the moment when the travel distance satisfies the first setting value or greater, as the compensation time, when it is determined that the travel distance is equal to or greater than the first setting value, and the calculating of the second altitude change amount may include calculating the difference between a first altitude at the compensation time and a second altitude at a previous time as the second altitude change amount.

The determining of the compensation time may include determining whether the first altitude change amount is equal to or greater than a predefined second setting value, and determining the moment when the first altitude change amount satisfies the second setting value or greater, as the compensation time, when it is determined that the first altitude change amount is equal to or greater than the second setting value, and the calculating of the second altitude change amount may include calculating the difference between a first altitude at the compensation time and the driving start altitude at the driving start time, as the second altitude change amount.

While this disclosure has been described in connection with what is presently considered to be practical example embodiments, it is to be understood that the present disclosure is not limited to the disclosed embodiments. On the contrary, it is intended to cover various modifications and equivalent arrangements included within the spirit and scope of the appended claims.

What is claimed is:

1. A method performed by an apparatus of a fuel cell electric vehicle (FCEV), the method comprising:

setting a first altitude at a start time of operating the FCEV;

determining, based on a measurement value of an accelerometer associated with the FCEV, a travel distance and a first amount of altitude change during a predetermined time duration since the start time;

determining, based on at least one of the travel distance or the first amount of altitude change, an adjustment time for adjusting past driving data of the FCEV;

determining, based on the adjustment time, a second amount of altitude change;

determining, based on the second amount of altitude change, a target state of charge (SOC) as an input parameter;

determining, based on a comparison between a current SOC and the target SOC, a required amount of additional fuel cell (FC) power generation; and controlling, based on the required amount of additional FC power generation, the FCEV.

2. The method of claim 1, wherein the determining of the travel distance and the first amount of altitude change comprises:

determining the travel distance based on:

a vehicle speed of the FCEV, and a tasking period of a vehicle control unit (VCU) of the FCEV.

3. The method of claim 2, wherein the determining of the travel distance comprises:

determining the travel distance based on Equation 1:

$$\Delta S = \int_{t_{n-1}}^{t_n} v\,dt \qquad \text{Equation 1}$$

wherein ΔS represents the travel distance, and wherein v represents the vehicle speed of the FCEV.

4. The method of claim 1, wherein the determining of the travel distance and the first amount of altitude change comprises:

determining the first amount of altitude change based on:

a vehicle speed of the FCEV, and a tasking period of a vehicle control unit (VCU) of the FCEV.

5. The method of claim 4, wherein the determining of the first amount of altitude change comprises:

determining the first amount of altitude change based on Equation 2:

$$\Delta h = \int_{t_{n-1}}^{t_n} v \sin(\theta)\,dt \qquad \text{Equation 2}$$

wherein Δh represents the first amount of altitude change, wherein v represents the vehicle speed of the FCEV, wherein sin(θ) represents an acceleration relationship between inclination θ of a road and an acceleration of the FCEV, and wherein the acceleration of the FCEV is measured by the accelerometer.

6. The method of claim 5, further comprising:

determining the acceleration relationship based on Equation 3:

$$\sin(\theta) = \frac{a_{veh} - \dot{v}_{hrw} + d\omega_{yaw}^2}{g} \qquad \text{Equation 3}$$

wherein $a_{veh}$ represents an accelerometer measurement value, wherein $\dot{v}_{hrw}$ represents a pitch term based on a movement of the FCEV, wherein $$d\omega_{yaw}^2$$

is a yaw term due to rotational inertia, and wherein g represents a gravitational acceleration.

7. The method of claim 1, wherein the determining of the adjustment time comprises:

determining whether the travel distance is greater than or equal to a threshold value; and determining the adjustment time by determining a first time at which the travel distance is greater than or equal to the threshold value, and wherein the determining of the second amount of altitude change comprises:

determining the second amount of altitude change by determining a difference between a second altitude at the adjustment time and a third altitude at a second time before the adjustment time.

8. The method of claim 1, wherein the determining of the adjustment time comprises:

determining whether the first amount of altitude change is greater than or equal to a threshold value; and determining the adjustment time by determining a first time at which the first amount of altitude change is greater than or equal to the threshold value, and wherein the determining of the second amount of altitude change comprises:

determining the second amount of altitude change by determining a difference between a first altitude at the adjustment time and the first altitude at the start time.

9. The method of claim 1, wherein the determining of the target SOC comprises:

determining the target SOC based on a mapping table associated with the second amount of altitude change.

10. A method performed by an apparatus of a fuel cell electric vehicle (FCEV), the method comprising:

setting a first altitude at a start time of operating the FCEV;

determining, based on a measurement value of an accelerometer associated with the FCEV, a travel distance and a first amount of altitude change during a predetermined time duration since the start time;

determining, based on the travel distance, a first adjustment time for adjusting past driving data of the FCEV;

determining, based on the first amount of altitude change, a second adjustment time for adjusting the past driving data of the FCEV;

determining, based on the first adjustment time and the second adjustment time, and based on characteristics of a driving path of the FCEV, a third adjustment time;

determining, based on the third adjustment time, a second amount of altitude change;

determining, based on the second amount of altitude change, a target state of charge (SOC) as an input parameter;

determining, based on a comparison between a current SOC and the target SOC, a required amount of additional fuel cell (FC) power generation; and controlling, based on the required amount of additional FC power generation, the FCEV.

11. The method of claim 10, wherein the determining of the travel distance and the first amount of altitude change comprises:

determining the travel distance based on:

a vehicle speed of the FCEV, and a tasking period of a vehicle control unit (VCU) of the FCEV.

12. The method of claim 10, wherein the determining of the travel distance and the first amount of altitude change comprises:

determining the first amount of altitude change based on:

a vehicle speed of the FCEV, and a tasking period of a vehicle control unit (VCU) of the FCEV.

13. The method of claim 10, wherein the determining of the first adjustment time comprises:

determining whether the travel distance is greater than or equal to a threshold value; and determining the first adjustment time by determining a time at which the travel distance is greater than or equal to the threshold value.

14. The method of claim 10, wherein the determining of the second adjustment time comprises:

determining whether the first amount of altitude change is greater than or equal to a threshold value; and determining the second adjustment time by determining a time at which the first amount of altitude change is greater than or equal to the threshold value.

15. The method of claim 10, wherein the determining of the second amount of altitude change comprises one of:

determining, based on the third adjustment time being determined according to the first adjustment time, the second amount of altitude change by determining a difference between a second altitude at the first adjustment time and a third altitude at a time before the first adjustment time; or determining, based on the third adjustment time being determined according to the second adjustment time, the second amount of altitude change by determining a difference between a fourth altitude at the second adjustment time and the first altitude at the start time.

16. An apparatus comprising:

one or more memory devices storing instructions; and one or more processors configured to execute the instructions to cause a fuel cell electric vehicle (FCEV) to:

set a first altitude at a start time of operating the FCEV;

determine, based on a measurement value of an accelerometer associated with the FCEV, a travel distance and a first amount of altitude change during a predetermined time duration since the start time;

determine, based on at least one of the travel distance or the first amount of altitude change, an adjustment time for adjusting past driving data of the FCEV;

determining, based on the adjustment time, a second amount of altitude change;

determining, based on the second amount of altitude change, a target state of charge (SOC) as an input parameter;

determining, based on a comparison between a current SOC and the target SOC, a required amount of additional fuel cell (FC) power generation; and controlling, based on the required amount of additional FC power generation, the FCEV.

17. The apparatus of claim 16, wherein the one or more processors are configured to execute the instructions to cause the FCEV to determine the travel distance by:

determining the travel distance based on:

a vehicle speed of the FCEV, and a tasking period of a vehicle control unit (VCU) of the FCEV.

18. The apparatus of claim 16, wherein the one or more processors are configured to execute the instructions to cause the FCEV to determine the first amount of altitude change by:

determining the first amount of altitude change based on:

a vehicle speed signal of the FCEV, and a tasking period of a vehicle control unit (VCU) of the FCEV.

19. The apparatus of claim 16, wherein the one or more processors are configured to execute the instructions to cause the FCEV to determine the adjustment time by:

determining whether the travel distance is greater than or equal to a threshold value; and determining the adjustment time by determining a first time at which the travel distance is greater than or equal to the threshold value, and wherein the one or more processors are configured to execute the instructions to cause the FCEV to determine the second amount of altitude change by:

determining the second amount of altitude change by determining a difference between a second altitude at the adjustment time and a third altitude at a second time before the adjustment time.

20. The apparatus of claim 16, wherein the one or more processors are configured to execute the instructions to cause the FCEV to determine the adjustment time by:

determining whether the first amount of altitude change is greater than or equal to a threshold value; and determining the adjustment time by determining a first time at which the first amount of altitude change is greater than or equal to the threshold value, and wherein the one or more processors are configured to execute the instructions to cause the FCEV to determine the second amount of altitude change by:

determining the second amount of altitude change by determining a difference between a first altitude at the adjustment time and the first altitude at the start time.

* * * * *